(12) United States Patent
Dwyer et al.

(10) Patent No.: US 8,095,096 B2
(45) Date of Patent: Jan. 10, 2012

(54) APPARATUS, AND ASSOCIATED METHOD, FOR OPERATING UPON RECEIVED DATA AT A RECEIVING STATION CAPABLE OF DIVERSITY OPERATION

(75) Inventors: Johanna Dwyer, Kanata (CA); Huan Wu, Kanata (CA); Sean Simmons, Waterloo (CA); Mark Pecen, Waterloo (CA)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 13/185,257

(22) Filed: Jul. 18, 2011

(65) Prior Publication Data

US 2011/0269417 A1 Nov. 3, 2011

Related U.S. Application Data

(63) Continuation of application No. 12/026,105, filed on Feb. 5, 2008, now Pat. No. 8,005,446.

(60) Provisional application No. 60/888,167, filed on Feb. 5, 2007.

(51) Int. Cl.
*H04B 17/02* (2006.01)
*H04B 1/02* (2006.01)

(52) U.S. Cl. ..... 455/132; 455/101; 455/135; 455/226.2; 455/293; 455/337

(58) Field of Classification Search ............... 455/132, 455/135, 226.2, 293, 337, 133, 130, 134, 455/101, 67.11, 161.3, 168.1, 225, 226.1, 455/226.3, 226.4, 227, 263, 277.2, 336, 272–273, 455/275, 102–103, 108; 375/347
See application file for complete search history.

(56) References Cited

U.S. PATENT DOCUMENTS

| | | | |
|---|---|---|---|
| 5,757,866 A | 5/1998 | Kannari et al. | |
| 6,009,310 A | 12/1999 | Motohashi | |
| 6,678,508 B1 | 1/2004 | Koilpillai et al. | |
| 6,741,838 B2 * | 5/2004 | Tsujimoto | 455/101 |
| 7,035,612 B2 * | 4/2006 | Kishimoto et al. | 455/277.1 |
| 7,072,628 B2 | 7/2006 | Agashe et al. | |
| 7,327,800 B2 * | 2/2008 | Oprea et al. | 375/267 |
| 7,366,143 B2 | 4/2008 | Akatsuka et al. | |
| 7,369,832 B2 | 5/2008 | Cho | |
| 7,400,872 B2 * | 7/2008 | Kogure | 455/134 |
| 7,610,019 B2 | 10/2009 | Moon et al. | |
| 7,643,813 B2 | 1/2010 | Saunders et al. | |
| 7,711,076 B2 | 5/2010 | Cho | |
| 2004/0219959 A1 | 11/2004 | Khayrallah et al. | |
| 2005/0136906 A1 | 6/2005 | Azuma | |
| 2005/0286658 A1 | 12/2005 | Hasebe et al. | |

(Continued)

FOREIGN PATENT DOCUMENTS

EP 0883208 A2 12/1998

(Continued)

*Primary Examiner* — Pablo N Tran

(57) ABSTRACT

Apparatus, and an associated method, for a receiving station, such as the receive part of a mobile station, that has diversity antennas. The receiving station includes both legacy demodulators and a diversity demodulator. Calculations are made to determine signal indicia associated with the signal energy detected at the diversity antennas. Responsive to the signal indicia, selection is made as to whether to utilize demodulation data, demodulated pursuant to a diversity demodulation technique or pursuant to a legacy demodulation technique. As the characteristics of received signals change, reselection of the demodulation is correspondingly made, such as on a frame-by-frame basis of frame-formatted data.

20 Claims, 3 Drawing Sheets

U.S. PATENT DOCUMENTS

| | | |
|---|---|---|
| 2006/0258304 A1 | 11/2006 | Moon et al. |
| 2007/0071149 A1* | 3/2007 | Li et al. .......................... 375/347 |
| 2007/0099670 A1* | 5/2007 | Naguib et al. ............. 455/562.1 |
| 2009/0029662 A1* | 1/2009 | Tsukio et al. ................. 455/138 |
| 2009/0215401 A1* | 8/2009 | Yoon et al. ................. 455/67.14 |
| 2010/0195754 A1* | 8/2010 | Li et al. .......................... 375/267 |
| 2010/0210235 A1* | 8/2010 | Ulupinar et al. ........... 455/278.1 |
| 2010/0255790 A1* | 10/2010 | Farajidana et al. ............. 455/69 |
| 2011/0003607 A1* | 1/2011 | Forenza et al. ................ 455/501 |
| 2011/0081869 A1* | 4/2011 | Breit et al. ................. 455/67.11 |

FOREIGN PATENT DOCUMENTS

| | | |
|---|---|---|
| JP | 2004-320528 A | 11/2004 |
| WO | 2005/088864 A1 | 9/2005 |

* cited by examiner

APPARATUS, AND ASSOCIATED METHOD, FOR OPERATING UPON RECEIVED DATA AT A RECEIVING STATION CAPABLE OF DIVERSITY OPERATION

CROSS-REFERENCE TO RELATED APPLICATION

The present application is a continuation of U.S. patent application Ser. No. 12/026,105 filed on Feb. 5, 2008, which claims priority to provisional patent application No. 60/888,167 filed on 5 Feb. 2007, the contents of which are incorporated herein by reference.

The present invention relates generally to a manner by which to facilitate operation of a receiver, such as the receive part of a cellular mobile station, capable of providing receive diversity through the use of a set of receive antennas. More particularly, the present invention relates to apparatus, and an associated method, by which to select in what manner to demodulate received data. Depending upon the characteristics of the received data, either diversity demodulation is selected to be used or legacy, i.e., conventional demodulation, is selected to be used. Reselection of the manner of demodulation is further provided. If the characteristics of the received data change in a way to cause the preferred manner by which to demodulate the data to change, then the manner of demodulation is to be changed.

BACKGROUND OF THE INVENTION

A variety of different types of mobile communication systems have been developed and deployed and are regularly utilized for communication. And, for many, ready access to a mobile communication system to communicate therethrough is a practical necessity. In a mobile radio communication system, as well as other types of communication systems, data is communicated between a set of communication stations including a sending station and a receiving station by way of a communication channel. In a mobile, or other radio, communication system, the communication channel is defined upon a radio link, part of the electromagnetic spectrum. The communication channel is non-ideal. During communication of the data upon the communication channel, the signal containing the data can become distorted. Additional distortion is sometimes also introduced upon the data once received at a receiving station. If the distortion is significant, the informational content of the data cannot accurately be recovered. Various techniques are provided in order to make compensation for, or otherwise to overcome, the distortion introduced upon the data. Space diversity, for instance, is sometimes provided, either at a sending station or at a receiving station, or both. Space diversity is created at a sending station, for instance, through the use two or more spaced-apart transmit antennas, thereby to provide spatial redundancy. Analogously, at a receiving station, use of two or more receive antennas analogously provides spatial diversity. In a cellular, or other mobile radio, communication system in which mobile stations are used by which to communicate, spatial diversity techniques have conventionally been utilized only at the network part of the communication system.

Use of diversity antennas at a mobile station has been, to date, generally limited. Mobile stations are generally small form-factor devices. Their small physical dimensions limit the use of multiple antennas. Additionally, use of multiple antennas also requires a corresponding increase in RF (Radio Frequency), front-end and base band processing of received data. Increased processor complexity and computational ability is required. Such increases result in a corresponding increase in power dissipation, adversely affecting battery longevity.

However, various advancements in circuit, and other, technologies, have increased the feasibility of use of spatial diversity at a mobile station.

Efforts, therefore, have been directed towards providing spatial diversity to a mobile station. For instance, work related to DARP (Downlink Advanced Receiver Performance) attempts to utilize an advanced receiver in a mobile terminal, having a single antenna, to increase the tolerance of the receive part of the mobile terminal to co-channel interferers. MSRD (Mobile Station Receiver Diversity) requirements are set forth therein for evolved EDGE (Enhanced Data for GSM Evolution) and are based, in part, on the DARP efforts.

Advanced receivers are implementable in various different manners. For instance, such receivers variously include, e.g., Joint Space Time Optimizing Filters (JSTOFs) or Weiner filters, and utilize, e.g., joint detection (JD) techniques. In DARP-related standardizations, envisioned communication signaling pertained primarily to improvements of GMSK (Gaussian Minimum Shift Keying) signaling. For instance, such signaling pertained to GSM (Global System for Mobile Communications) voice services, GPRS (General Packet Radio Service) and the most-robust Modulation and Coding Schemes (MCS) used in EDGE-based communications at lower data interchange speeds, e.g., MCS-1 through MCS-4. Simple extension of the capabilities of DARP requirements to more-complex techniques, such as 8-PSK, 16-ary or 32-ary modulation techniques, used for higher-speed EDGE modulation and coding schemes, are generally envisioned to require, or be improved by the use of multiple RF receivers, amenable for multiple-antenna implementations.

Various issues remain with respect to use of spatial diversity at a small form-factor receive station, such as a mobile station. And, further efforts with respect to implementation of such receiving stations that have spatial diversity is required.

It is in light of this background information related to the use of spatial diversity in communication systems that the significant improvements of the present invention have evolved.

DETAILED DESCRIPTION

Figure 1:
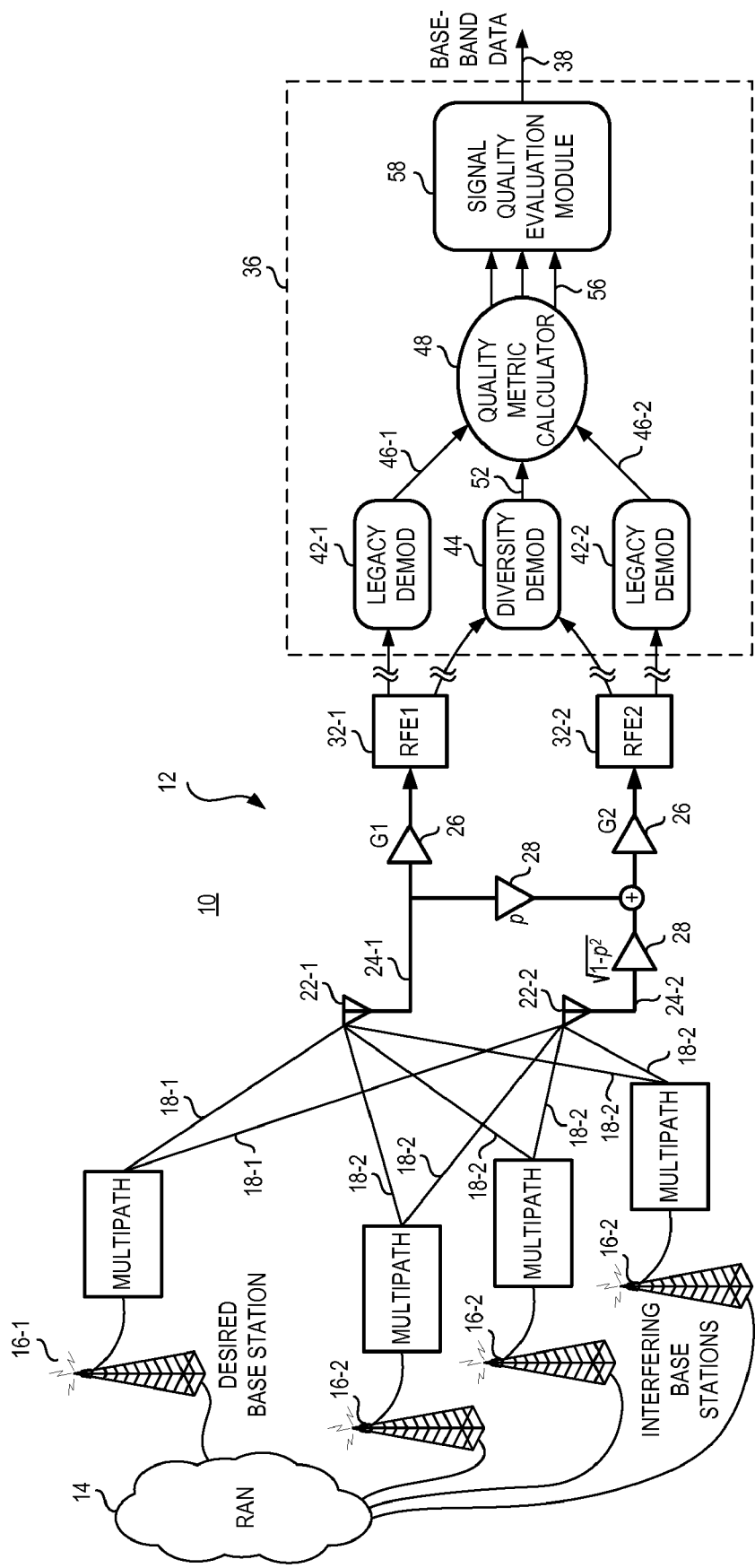
FIG. 1 illustrates a functional block diagram of a radio communication system in which an embodiment of the present invention is operable.

The present invention, accordingly, advantageously provides apparatus, and an associated method, for a receiver, such as the receive part of a mobile station, that is capable of providing receive diversity through use of a set of spaced-apart, receive antennas.

Through operation of an embodiment of the present invention, a manner is provided by which to select in what manner to demodulate received data.

In one aspect of the present invention, depending upon the characteristics of the received data, either diversity demodulation is selected to be used or legacy, i.e., conventional, single-chain demodulation is selected to be used.

In another aspect of the present invention, reselection of the manner of demodulation is further provided. If the characteristics of the received data change in a way such that a different demodulation-type would better facilitate recovery of the informational content of the data, a change of the manner by which the received data is demodulated is made.

In another aspect of the present invention, a multiple-antenna arrangement is provided for a small form-factor mobile station. Through the use of separate antennas the strength of the signal energy of the communicated data that is detected at the respective antennas, and applied to receiver front-ends, might well differ. In addition, the signals received at the respective antennas and applied to the receiver front-ends may exhibit some correlation. Various factors affect the signal correlation and signal strength. The multi-path fading environment of the radio channel, the design of the antennas, their physical separation, and the construction, and configuration, of the mobile station are all exemplary affecting factors. Additionally, signal-strength-affecting factors include, e.g., channel fading conditions and even the position of a user as the user operates the mobile station. In addition, the frequency band of operation is an exemplary factor that affects signal strength and the correlation between two or more signal paths received by two or more separate receivers.

In another aspect of the present invention, a receiver structure is provided that includes a diversity demodulator that is connected to receive indications of signal energy detected at the separate antennas of the diversity-antenna arrangement. When the detected signal energy is of characteristics such that diversity demodulation would be the beneficial manner by which to demodulate the detected data, results of the diversity demodulation are used in the receive chain to recover the informational content of the detected data.

In another aspect of the present invention, the receiver structure further includes legacy, i.e., conventional, demodulators configured in separate receive-chain paths with the separate ones of the antennas of the set of diversity antennas. The legacy demodulators demodulate signal data of the single antennas to which the respective demodulators are coupled. Depending upon the characteristics of the receive signals, legacy-demodulated data, demodulated by a selected legacy demodulator, is used with additional receive chain elements to recover the informational content of the communicated data.

In another aspect of the present invention, signal indicia measurement is made of the detected data, such as to determine a quality metric associated with the detected data, correlation between signal energy detected at the separate ones of the antennas, amplitude differences there between, as well as any of various other measurements and indicia. Evaluation is made of the calculated or measured indicia, and determination is made as to which demodulated data, one of the legacy-demodulated data or the diversity-demodulated data, is to be used to recover the informational content of the received signal. Successive iterations of the measurements or calculations are made. If the conditions change to an extent that the manner by which the modulation is to be performed changes, a change is made. When, for instance, the communicated data comprises frame-formatted data, new measurements and calculations are made on a frame-by-frame basis, or intermittently, e.g., every selected number of frames. And, new selection of whether to utilize diversity demodulated data or legacy-demodulated data is made. Thereby, as characteristics of the communicated data change, demodulated data that best facilitates recovery of the informational content of the detected data is made.

In another aspect of the present invention, indicia measurement, calculation, evaluation, and selection is made prior to demodulation of the data. And, responsive to the selection, the appropriate demodulator is made operable to demodulate the detected data. Alternately, all of the demodulators are concurrently operable, and selection is made as to which of the demodulated data is to be provided to additional receive chain elements for further processing.

Thereby, receive diversity is provided to a receiving station while providing for demodulation of the detected data in a manner that best facilitates recovery of its informational content.

In these and other aspects, apparatus, and an associated method, is provided for a receiving station that contains a first diversity antenna and a second diversity antenna. A receive signal indicia operator is adapted to receive a first signal indicia associated with first signal energy detected at the first diversity antenna and to receive a second signal indicia associated with second signal energy detected at the second diversity antenna. The receive signal indicia operator is configured to operate upon the first and second signal indicia, respectively, to ascertain an attribute thereof. A selector is adapted to receive an indication of the attribute ascertained by the receive signal indicia operator. The selector is configured to select which of diversity demodulation results of a combination of the first and second signal energy, and separate demodulation results of the first signal energy or the second signal energy, are to be used at the receiving station.

Referring first, therefore, to FIG. 1, a radio communication system, shown generally at 10, provides for radio communications with mobile stations, of which the mobile station 12 is representative. The receive part of the mobile station 12 is represented in FIG. 1. The mobile station communicates with a radio access network (RAN) 14 that includes a plurality of base transceivers 16 here, e.g., BTS, NODEBs or eNODES. Here, the mobile station is positioned at a location permitting its reception of signals sent by a desired base station 16-1 and, additional base stations 16-2 whose signals that are sent on channels that interfere with the signals sent by the base station 16-1.

In the exemplary implementation, the communication system 10 forms a cellular radio communication system operable in general conformity with the operating procedures and protocols a GSM/GPRS/EDGE (Global System for Mobile communications/General Packet Radio Service/Enhanced Data for GSM Evolution)—capable cellular communication system. More generally, the communication system is representative of any of various types of communication systems that benefit from the use of diversity communication techniques. And, while downlink communications are described, more generally, the communications are representative of communications between any set of communication stations formed of a sending station and a receiving station.

The radio channels are multi-path channels and signals sent by both the base station 16-1 and the interfering base stations 16-2 are communicated upon multi-paths, here shown by paths 18-1 and 18-2. Multi-path communication results in fading conditions, both with respect to the desired signal and with respect to the co-channel, interfering signals.

The receive part of the mobile station that includes, here, a pair of receive antennas 22-1 and 22-2, positioned, such as by being spaced-apart from one another by appropriate, effective separation distances, to provide receive antenna diversity. Spatial diversity can be provided in other manners, too, e.g., by use of directional antennas. The antennas 22 operate in conventional manner to transduce electromagnetic energy into electrical energy that is representative of the detected signal energy. The detected signal energy includes both the desired signal and interference, both co-channel interference and interference caused by multi-path transmission. The signal energy and phases detected at the antennas are correlated. The correlation is modeled as a complex correlation and is designated as "rho". Correlation is modeled, e.g., in complex terms. The instantaneous value of the correlation is a function of the radio propagation environment, the antenna design, and the physical layout of the mobile terminal device.

Electrical indications representative of the detected signal energy at the antennas 22 are provided on lines 24-1 and 24-2. The indications are operated upon by conventional gain, and other, elements 26 and 28, in conventional manner to provide amplified indications to RF (Radio Frequency) elements 32. In addition to gain elements traditionally present, the gain elements illustrated here by factors G1 and G2 also include variable attenuation factors. These variable factors can include but are not limited to attenuation due to the mobile station user positioning, and can also account for noise-figure differences in the separate receive chains. The configuration of these elements provides for different signals detected at the separate antennas. The signals are correlated using weighting factors at the elements 26. An amplified indication of the electrical representation of the detected signal energy, detected at the antenna 22-1 is provided to the RF element 32-1. And, an amplified indication of the electrical representation of the detected signal energy, detected at the antenna 22-2, is provided to the RF element 32-2. RF operations are performed at the respective elements 32-1 and 32-2.

The receive part of the mobile station includes apparatus 36 of an embodiment of the present invention. The apparatus 36 is formed of functional elements, implementable in any desired manner, including, in part, by algorithms executable by processing circuitry. The apparatus forms demodulated, baseband data on the line 38 that is provided to additional receive-part elements (not shown), conventionally utilized to recover the informational content of data, such as data communicated pursuant to a GSM/GPRS/EDGE communication service.

The apparatus includes legacy, i.e., conventional, demodulators 42. The legacy demodulator 42-1 is coupled to the RF element 32-1 and receives an indication that is representative of the signal energy detected at the antenna 22-1. Analogously, the legacy demodulator 42-2 is coupled to the RF element 32-2 and receives an indication of the signal energy detected by the antenna 22-2. The legacy demodulators demodulate, in conventional manner, the indications provided thereto. The demodulators 42-1 and 42-2 operate independently in that the indications applied to the respective demodulators 42 are representative of the signal energy detected at the separate antennas.

The apparatus 36 further includes a diversity demodulator 44. The diversity demodulator is coupled to both of the RF elements 32-1 and 32-2. The diversity demodulator demodulates, according to a diversity demodulation technique, a combination of the indications of the signal energy detected at both of the antennas 22-1 and 22-2.

Depending upon the characteristics of the signal energy detected at the antennas, one type of demodulation may provide a better error rate than the others. That is to say, the legacy demodulation is preferable to the diversity demodulation when the receive signal energy in each of the branches is of first characteristics. And, diversity demodulation is preferable to the legacy demodulation when the receive signal energy in each of the branches is of second characteristics. Lines 46-1 and 46-2 extend from the respective legacy demodulators to a quality metric calculator 48. And, line 52 extends from the diversity demodulator 44 to the quality metric calculator. The quality metric calculator operates to calculate selected quality metrics associated with the demodulated data, demodulated by the demodulators 42 and 44. Exemplary quality metrics calculated by the calculator include a BER (Bit Error Rate), a BLER (Block Error Rate), an FER (Frame Error Rate), an SNR (Signal-to-Noise) ratio, a C/I (Carrier to Interference Ratio), a SINR (Signal-to-Interference plus Noise ratio), an associated $E_b/N_0$, or any other appropriate metric.

Calculated values formed by the calculator 48 are provided, here represented by way of the lines 56, to a signal quality evaluation module and selector 58. The element 58 makes selection, responsive to the quality metric value or values provided thereto of which of the demodulated data is to be formed on the line 38 and used pursuant to further receive chain operation. In one implementation, the evaluation module and selector 58 employs a searching algorithm that operates, e.g., to perform a mathematical MIN operation that determines a mathematical minimization of a sum or a weighted sum of all error rate metrics. In another implementation, the evaluation module and selector 58 operates to perform a mathematical MAX operation that determines a mathematical maximization of a sum or a weighted sum of all signal quality metrics. Responsive to such calculations, a decision is made as to which demodulated data stream is to be forwarded on the line 38.

FIG. 2 again illustrates the communication system 10. The communication system 10 again is shown to include a mobile station 12, a radio access network 14 having a plurality of base transceiver stations 16, and multi-paths 18 upon which signals generated at the base transceiver stations are communicated to the mobile station.

The receive part of the mobile station is again shown to include a set of receive antennas 22, which transduce electromagnetic energy into electrical energy on the lines 24. Circuit elements 26 and 28 and RF elements 32 are again shown at the RF part of the receive chain of the mobile station. And, the line 38 extends to additional receive chain elements (not shown). Here, the apparatus 36 operates pursuant to an alternate embodiment of the present invention. Again, the apparatus 36 includes legacy demodulators 42-1 and 42-2 and a diversity demodulator 44, each coupled in the same manners to the RF elements 32, either separately with respect to the legacy demodulators or to both of the elements with respect to the diversity demodulator. In this implementation, the legacy demodulators 42 are connected by way of the lines 66-1 and 66-2, respectively, to a first side of a switch element 68. And, a line 72 extends from the demodulator 44 to the first side of the switch element 68. A second side of the switch element 68 is connected to the line 38.

In this implementation, the apparatus also includes a correlation detector 74 and an amplitude difference calculator 76. The functions 74 and 76 are coupled to the RF elements 32 to receive indications of the signal energy detected at the respective antennas 22. The correlation detector 74 operates to calculate the correlation between the signal energy and phase received at the input to the apparatus 36s. And, the amplitude difference calculator operates to calculate differences between the amplitudes of the signal energy.

Calculations made by the functions 74 and 76 are provided to a demodulation selector 78. Responsive to the values provided thereto, selection is made by the selector as to which of the demodulation types, i.e., legacy demodulation or diversity demodulation, is to be utilized to demodulate values on the line 38. And, responsive to the selection, the selected demodulation operation is performed only by the appropriate demodulator, 42 or 44.

Figure 2:
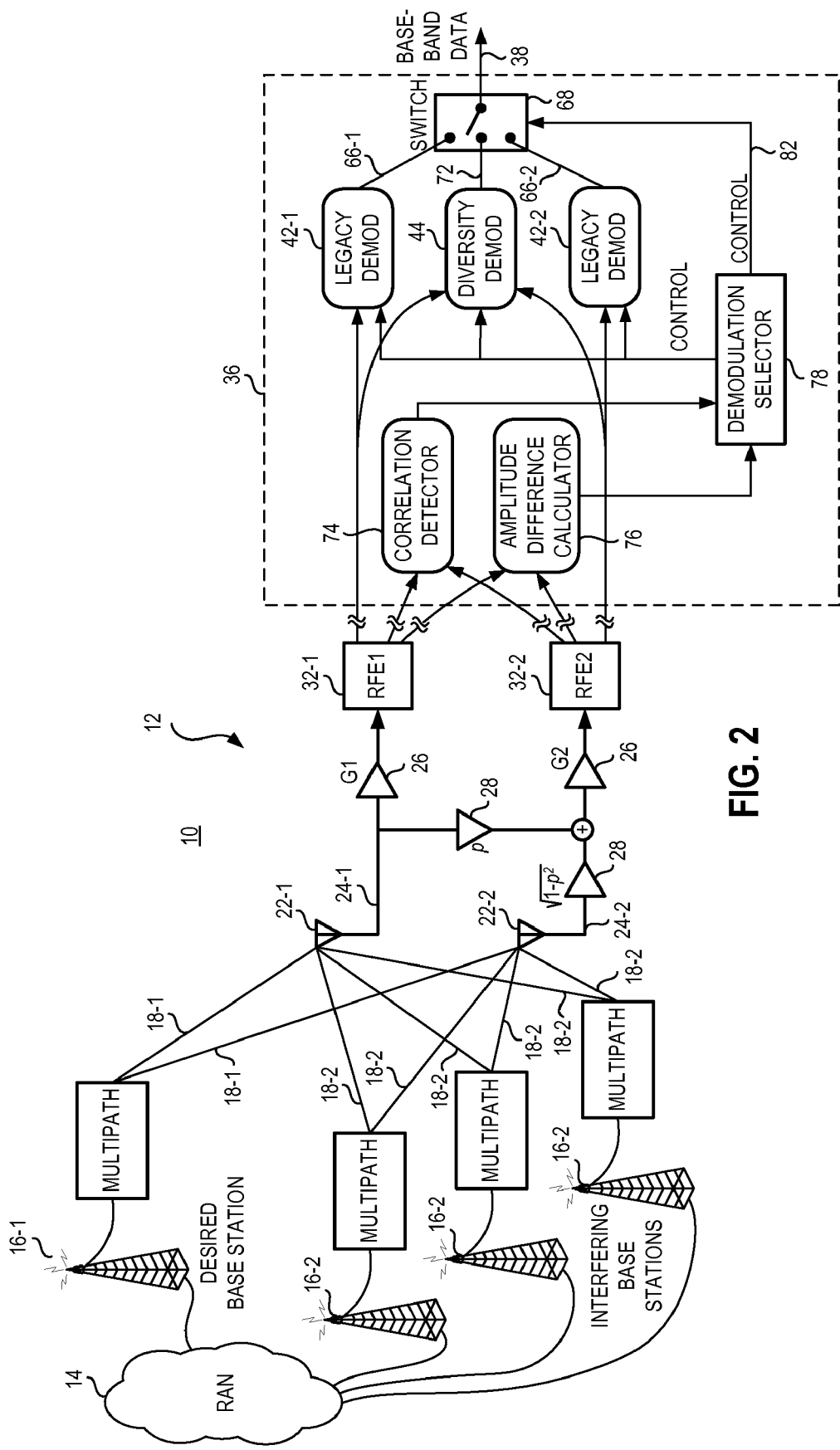
FIG. 2 illustrates a functional block diagram, similar to that shown in FIG. 1, but in which a receiving station operates pursuant to an alternate embodiment of the present invention.

In the embodiment shown in FIG. 2, the demodulation decision is made prior to the demodulation rather than subsequent to demodulation, as utilized in the embodiment shown in FIG. 1.

Determination is made at the elements 58 and 78 in FIGS. 1 and 2, respectively, to cause demodulated data to be formed on the line 38 formed alternately by a legacy demodulation technique or by a diversity demodulation technique. The selection is made of the demodulation technique that yields a best signal quality of the baseband data, e.g., subject to constraints. The constraints include, for instance, the constraint that both of the receive chain parts be available for diversity reception, that is, the second receive chain is not being used to receive additional information on a different receive frequency, and neither receive chain part is powered-down, such as might occur to reduce current consumption at the mobile station. An additional constraint is, e.g., that the mobile station has the processing capacity to demodulate the data individually at both of the receive chains as well as jointly by the diversity demodulator during each successive frame of the receive data. An additional constraint is, e.g., that the signal quality metric calculations performed on the receive data is updated during each frame. The quality metric values, in one implementation, are further averaged or filtered using different FIR or IIR filter techniques over a time period, such as the duration of a call or packet transfer.

In the embodiment shown in FIG. 1, the signals formed on the separate RF chains are demodulated individually with legacy demodulators as well as jointly with the diversity demodulator. Various quality metrics, such as those previously mentioned, are used to determine selection of which stream of demodulated data is to be formed on the line 38 and provided, e.g., to baseband processing elements.

In the embodiment shown in FIG. 2, the signals formed on the separate RF chains are provided to the amplitude difference calculator 76 and to the correlation detector 74. Calculations performed thereat are provided to the selector 78. And, selection is made of the demodulation-type to be utilized responsive to such values. The selector, in one implementation, first analyzes the amplitude difference calculated by the amplitude difference calculator. If the amplitude difference between the signals on the separate paths is greater than a selected threshold, the selection chooses legacy demodulation using the legacy demodulator connected to the signal path on which the signal energy of the greatest amplitude to be utilized and to form the demodulated data generated on the line 38. The selected threshold is, e.g., based upon the diversity receiver implementation and system simulations and is set, e.g., to a level at which the diversity receiver no longer performs as well as a legacy demodulator.

In an alternate embodiment, further determination is made whether the signal energy amplitude generated on the separate RF paths is above a selected level, a "good signal threshold" level but in which the amplitude level difference is greater than the selected level. If the demodulator is capable of calculating the interference level, then the selector selects the demodulator on the receive path that exhibits the greater SINR level.

If the amplitude difference determined by the calculator 76 is less than the selected threshold, then calculations made by the correlation detector are examined. If the calculated correlation is greater than a selected threshold, then legacy demodulation is utilized. The legacy demodulator connected in the receive chain that has the greatest power level is used. In an alternate implementation, in an occurrence in which the amplitude level difference is acceptable but the correlation between the signals on the respective receive chain branches is greater than a selected threshold, the selector operates to perform demodulation at the legacy demodulator in the branch that exhibits the greater SINR level while also having an energy amplitude level above the selected "good signal threshold". In another implementation of this occurrence, the two legacy demodulators perform certain initial processing (e.g. channel estimation and matched filtering) and then combine them to improve SNR. The combined signal is used for the rest of the demodulation.

If, conversely, the detected correlation is less than the selected threshold, and the amplitude difference is also less than a selected threshold, then diversity demodulation is selected to be utilized. In FIG. 2, the selector 78 generates a signal on the line 82 that causes operation of the demodulators 42 and 44. And, the selector further generates a signal on the line 84 that controls positioning of the switch element 68 in a correspondingly appropriate manner.

That is to say, responsive to selection by the selector, an appropriate one of the legacy demodulator 42-1 or 42-2, or the diversity demodulator 44, is selected. And, the switch element 68 is caused to be positioned to pass the demodulated data on to the line 38 for further processing.

Figure 3:
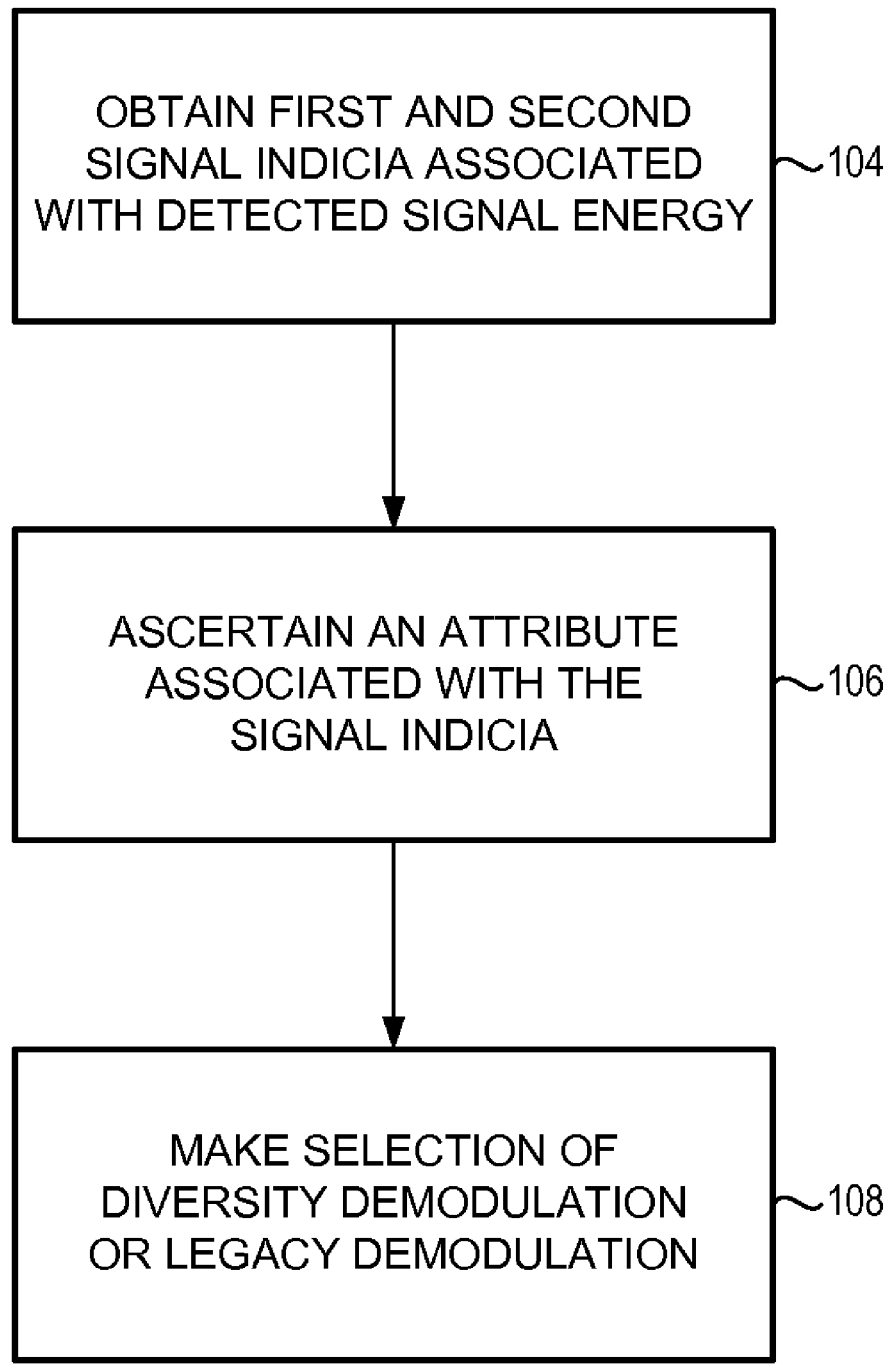
FIG. 3 illustrates a method flow diagram representative of the method of operation of an embodiment of the present invention.

FIG. 3 illustrates a method flow diagram, shown generally at 102, representative of the method of operation of an embodiment of the present invention. The method operates to facilitate data recovery at a receiving station that has a first diversity antenna and a second diversity antenna.

First, and as indicated by the block 104, a first and a second signal indicia are obtained. The first signal indicia is associated with first signal energy detected at the first diversity antenna. And, a second signal indicia associated with signal energy detected at the second diversity antenna is obtained.

Then, and as indicated by the block 106, an attribute associated with the first and second signal energy is ascertained. Then, and as indicated by the block 108, selection is made, responsive to the ascertained attribute, to which of diversity demodulation results of the combination of the first and second signal energy and separate demodulation results of the first signal energy or the second signal energy is to be used at the receiving station.

Thereby, a manner is provided by which to utilize demodulated data depending upon the characteristics of the detected signal energy. As characteristics of the detected signal energy change, reselection of the demodulation is correspondingly made and the demodulation-type is changed, if needed. Improved receiver performance thereby results.

What is claimed is:

1. Apparatus for a radio receiver employing a first diversity antenna that develops a first electrical energy signal from an electromagnetic signal comprising data modulated thereon and a second diversity antenna that develops a second electrical energy signal from the electromagnetic signal, comprising:

a first legacy demodulator coupled to the first diversity antenna;

a second legacy demodulator coupled to the second diversity antenna;

a diversity demodulator coupled to both the first diversity antenna and the second diversity antenna;

an amplitude difference calculator coupled to both the first diversity antenna and the second diversity antenna;

a correlation detector coupled to both the first diversity antenna and the second diversity antenna; and a demodulator selector accepting a representation of an amplitude difference between the first electrical energy signal and the second electrical energy signal from said amplitude difference calculator and determining whether said representation of an amplitude difference is less than an amplitude threshold, accepting a representation of correlation between the first electrical energy signal and the second electrical energy signal from said correlation detector when said representation of an amplitude difference is less than said amplitude threshold and determining whether said representation of correlation is less than a correlation threshold, and selecting said diversity demodulator to demodulate the modulated data when said representation of correlation is less than said correlation threshold.

2. The apparatus of claim 1 wherein said representation of an amplitude difference is not less than said amplitude threshold and wherein said demodulator selector responsively selects one of said first legacy demodulator and said second legacy demodulator to demodulate the modulated data.

3. The apparatus of claim 2 wherein said first legacy demodulator and said second legacy demodulator further comprise at least one interference level calculator, whereby a determination of signal-to-interference ratio is made, said demodulator selector responsively selects one of said first legacy demodulator and said second legacy demodulator to demodulate the modulated data based on which of said first legacy demodulator and said second legacy demodulator exhibits the greater signal-to-interference ratio.

4. The apparatus of claim 2 further comprising a reselector, responsive to demodulated data, that causes said demodulator selector to operate to reselect one of said first legacy demodulator, said second legacy demodulator, and said diversity demodulator when a characteristic of said demodulated data changes.

5. The apparatus of claim 2 further comprising a switch coupled to said demodulator selector that switches between one of said first legacy demodulator, said second legacy demodulator, and said diversity demodulator.

6. The apparatus of claim 1 wherein said representation of correlation is not less than said correlation threshold and wherein said demodulator selector responsively selects at least one of said first legacy demodulator and said second legacy demodulator to demodulate the modulated data.

7. The apparatus of claim 6 wherein said first legacy demodulator and said second legacy demodulator further comprise at least one interference level calculator, whereby a determination of signal-to-interference ratio is made, said demodulator selector responsively selects one of said first legacy demodulator and said second legacy demodulator to demodulate the modulated data based on which of said first legacy demodulator and said second legacy demodulator exhibits the greater signal-to-interference ratio.

8. The apparatus of claim 6 wherein said first legacy demodulator and said second legacy demodulator each further comprise an initial signal processor and wherein said demodulator selector further comprises a combiner coupled to said first legacy demodulator initial signal processor and said second legacy demodulator initial signal processor.

9. The apparatus of claim 8 wherein each said initial signal processor further comprises a channel estimator and a matched filter.

10. The apparatus of claim 1 further comprising an energy amplitude determiner that determines when the first electrical energy and the second electrical energy are greater than a signal threshold.

11. A method for operating a radio receiver employing a first diversity antenna that develops a first electrical energy signal from an electromagnetic signal comprising data modulated thereon and a second diversity antenna that develops a second electrical energy signal from the electromagnetic signal, comprising:
calculating a representation of an amplitude difference between the first electrical energy signal and the second electrical energy signal;
detecting a correlation value for the first electrical energy signal and the second electrical energy signal;
determining whether said representation of an amplitude difference is less than an amplitude threshold;
determining whether said correlation value is less than a correlation threshold when said representation of amplitude difference is less than said amplitude threshold; and
selecting a diversity demodulator to demodulate the modulated data when said correlation value is less than said correlation threshold.

12. The method of claim 11 further comprising selecting one of a first legacy demodulator and a second legacy demodulator to demodulate the modulated data when said representation of an amplitude difference is not less than said amplitude threshold.

13. The method of claim 12 wherein said first legacy demodulator and said second legacy demodulator further comprise at least one interference level calculator, further comprising determining a signal-to-interference ratio and responsively selecting one of said first legacy demodulator and said second legacy demodulator to demodulate the modulated data based on which of said first legacy demodulator and said second legacy demodulator exhibits a greater signal-to-interference ratio.

14. The method of claim 12 further comprising reselecting one of said first legacy demodulator, said second legacy demodulator, and said diversity demodulator when a characteristic of said demodulated data changes.

15. The method of claim 11 further comprising selecting one of a first legacy demodulator and a second legacy demodulator to demodulate the modulated data when said correlation value is not less than said correlation threshold.

16. The method of claim 13 wherein said first legacy demodulator and said second legacy demodulator further comprise at least one interference level calculator, further comprising determining a signal-to-interference ratio and responsively selecting one of said first legacy demodulator and said second legacy demodulator to demodulate the modulated data based on which of said first legacy demodulator and said second legacy demodulator exhibits a greater signal-to-interference ratio.

17. The method of claim 15 further comprising combining an output of said first legacy demodulator and an output of said second legacy demodulator.

18. The method of claim 17 wherein said combining further comprises a channel estimation and matched filtering of each said first legacy demodulator output and said second legacy demodulator output.

19. The method of claim 11 further comprising determining when the first electrical energy and the second electrical energy are greater than a signal threshold.

20. The method of claim 11 further comprising switching to an output of said diversity demodulator when said correlation value is less than said correlation threshold.

* * * * *